United States Patent
Nishio et al.

(10) Patent No.: US 6,905,344 B2
(45) Date of Patent: Jun. 14, 2005

(54) MODULE CONNECTOR

(75) Inventors: Atsushi Nishio, Ibaraki (JP); Takashi Kawasaki, Ibaraki (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/628,331

(22) Filed: Jul. 29, 2003

(65) Prior Publication Data

US 2004/0023527 A1 Feb. 5, 2004

(30) Foreign Application Priority Data

Jul. 31, 2002 (JP) .................................... P. 2002-224127

(51) Int. Cl.[7] .............................................. H01R 9/09
(52) U.S. Cl. .......................................... 439/68; 439/70
(58) Field of Search ............................. 439/68, 70, 71; 324/158 F, 755, 754

(56) References Cited

U.S. PATENT DOCUMENTS

| | | | |
|---|---|---|---|
| 4,645,279 A | * | 2/1987 | Grabbe et al. ................ 439/68 |
| 4,739,356 A | | 4/1988 | Ogura et al. |
| 5,073,117 A | | 12/1991 | Malhi et al. |
| 5,398,154 A | * | 3/1995 | Perkins et al. ............... 361/212 |
| 6,328,574 B1 | * | 12/2001 | Howell et al. ................ 439/70 |

FOREIGN PATENT DOCUMENTS

| | | |
|---|---|---|
| EP | 1 148 716 | 10/2001 |
| EP | 1 213 924 | 6/2002 |

* cited by examiner

Primary Examiner—Alexander Gilman
(74) Attorney, Agent, or Firm—Whitham, Curtis & Christofferson, PC

(57) ABSTRACT

In a connector, to which a module body is electrically connected, a connector body has an inner side face defining a chamber which accommodates the module body. The chamber is formed with an opening from which the module body is inserted. A first, conductive terminal is provided on the inner side face such that a conductive member formed on an outer periphery of the module body is brought into contact with the first terminal in a case where the module body is plenarily accommodated in the chamber. A second, grounding terminal is provided on the inner side face and operable to be brought into contact with the conductive member of the module body.

9 Claims, 6 Drawing Sheets

MODULE CONNECTOR

BACKGROUND OF THE INVENTION

This invention relates to a connector to which a module body such as a memory module and a camera module is fitted.

FIGS. 4A to 4C show a related-art camera module 1 to be mounted on a cellular mobile phone or the like, and this camera module 1 comprises a module body 2, and a lens portion 3 formed on an upper side of the module body 2. Two deft and right) rows of contact pads 4 and 5 are formed on a bottom face of the module body 2.

FIGS. 5A to 5C show a related-art connector 6 to which the camera module 1 is fitted. The connector 6 is formed into a square box-like body having an upwardly-open chamber 6a. Two deft and right) rows of parallel grooves 7 and 8 are formed in an upper face of a bottom 6b of the chamber 6a, so that the left grooves 7 extend from a central portion of the bottom 6b to an inner left side wall of the chamber 6a, and the right grooves 8 extend from the central portion of the bottom 6b to an inner right side wall of the chamber 6a. A row of left contact pins 9 are provided in the left grooves 7, respectively, while a row of right contact pins 10 are provided in the right grooves 8, respectively.

As shown in FIG. 6, an inner end portion of each of the left row of contact pins 9 is bent upwardly to project from an associated groove 7 to form a contact projection 9a for contact with an associated contact pad 4 of the camera module 1. Each contact pin 9 extends left, and passes through the connector 6 to project to the exterior, and an outer end portion of the contact pin 9 is bent to form a terminal 9b for contact with a wiring board (not shown) on which the connector 6 is mounted.

Similarly, an inner end portion of each of the right row of contact pins 10 is bent upwardly to project from an associated groove 7 to form a contact projection 10a for contact with an associated contact pad 5 of the camera module 1. Each contact pin 10 extends right, and passes through the connector 6 to project to the exterior, and an outer end portion of the contact pin 10 is bent to form a terminal 10b for contact with the wiring board.

When the contact projections 9a and 10a of the contact pins 9 and 10 are pressed down respectively by the contact pads 4 and 5 of the camera module 1 from the upper side, the contact pins 9 and 10 are bent as indicated in phantom lines in FIG. 6, so that the distal ends (inner ends) of the contact pins 9 and 10 abut against the bottom of the grooves 7 and 8. The contact pins 9 and 10 are accordingly held in firm press-contact respectively with the contact pads 4 and 5 because of reaction forces of these contact pins.

When the camera module 1 is inserted into the chamber 6a of the connector 6 from the upper side of this connector 6, the contact pads 4 and 5 of the camera module 1 are press-contacted respectively with the contact projections 9a and 10a of the connector pins 9 and 10 of the connector 6, as shown in FIG. 7.

Signals of the camera module 1 are transmitted to the contact pins 9 and 10 via the contact pads 4 and 5 and the contact projections 9a and 10a, and further are transmitted to a circuit (not shown) of the wiring board via the terminals 9b and 10b.

In the above construction, however, the contact projections 9a and 10a of the contact pins 9 and 10 of the connector 6 are simultaneously brought into contact with the contact pads 4 and 5 of the camera module 1. Since it is not provided a measure for removing static electricity, there is an anxiety that the camera module 1 or an electric circuit connected to the connector 6 is damaged by static electricity.

SUMMARY OF THE INVENTION

It is therefore an object of the invention to provide a module connector in which the static electricity on an attached module body can be surely removed to prevent damage due to the static electricity.

In order to achieve the above object, according to the invention, there is provided a connector, to which a module body is electrically connected, comprising:

a connector body, having an inner side face defining a chamber which accommodates the module body, the chamber formed with an opening from which the module body is inserted;

a first, conductive terminal, provided on the inner side face such that a conductive member formed on an outer periphery of the module body is brought into contact with the first terminal in a case where the module body is plenarily accommodated in the chamber; and a second, grounding terminal, provided on the inner side face and operable to be brought into contact with the conductive member of the module body.

With such a configuration, the static electricity on the module body is removed when the conductive member of the module body is brought into contact with the grounding terminal, so that damage due to the static electricity is prevented.

It is preferable that: the chamber has a rectangular cross section when viewed from the opening; and the first terminal and the second terminal are provided on each of four inner side faces defining the chamber.

With such a configuration, the conductive member of the module body may be brought into contact with any one of the ground terminals provided respectively at the four inner side faces. Therefore, the static electricity can be surely removed.

Preferably, the second terminal is provided at a portion closer to the opening than the first terminal, so that the conductive member of the module body is first brought into contact with the second terminal when the module body is inserted into the chamber.

With such a configuration, the static electricity can be removed more safely.

Here, it is preferable that the second terminal is formed with a protrusion which engages with the module body in a case where the module body is plenarily accommodated in the chamber.

With such a configuration, the module body can be retained against withdrawal with the simple construction.

Preferably, the first terminal and the second terminal are extended in a direction parallel to an inserting direction of the module body.

Preferably, the module body is a camera module.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

One preferred embodiment of the present invention will now be described in detail with reference to the accompanying drawings.

Figure 1A:
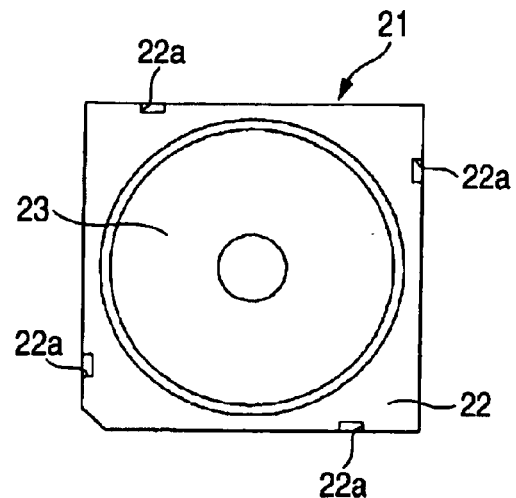
FIG. 1A is a top plan view of a camera module according to one embodiment of the invention.
Figure 1B:
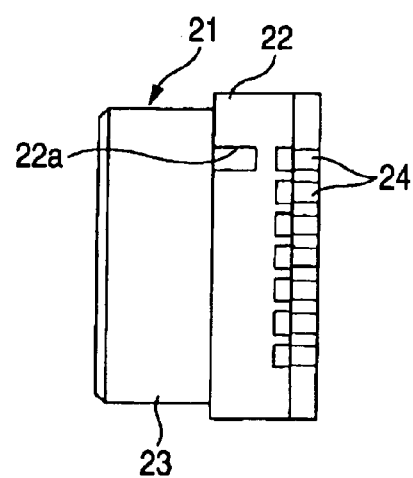
FIG. 1B is a side view of the camera module.
Figure 1C:
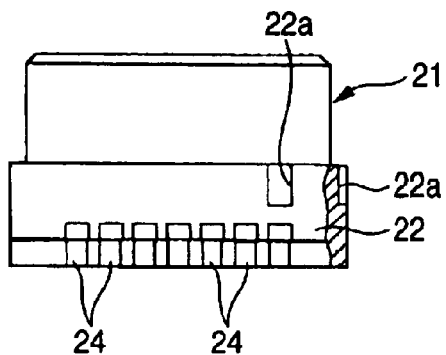
FIG. 1C is a partly sectional front view of the camera module.
Figure 1D:
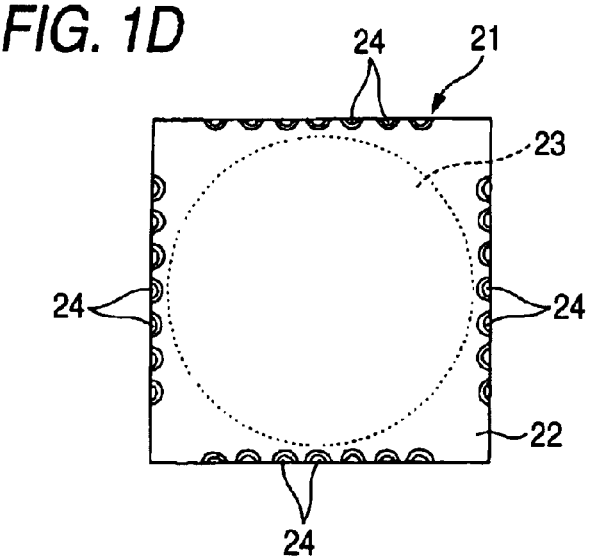
FIG. 1D is a bottom plan view of the camera module.

FIGS. 1A to 1D show a camera module 21 mounted on a cellular mobile phone or the like, and this camera module 21 comprises a module body 22, and a lens portion 23 formed on an upper side of the module body 22. A plurality of parallel contact pads 24 are formed at a lower half portion of each of four side faces of the module body 22, and extend vertically.

A recess 22a is formed in each of the four side faces of the module body 22 at an upper edge portion thereof, and extends vertically.

Figure 2A:
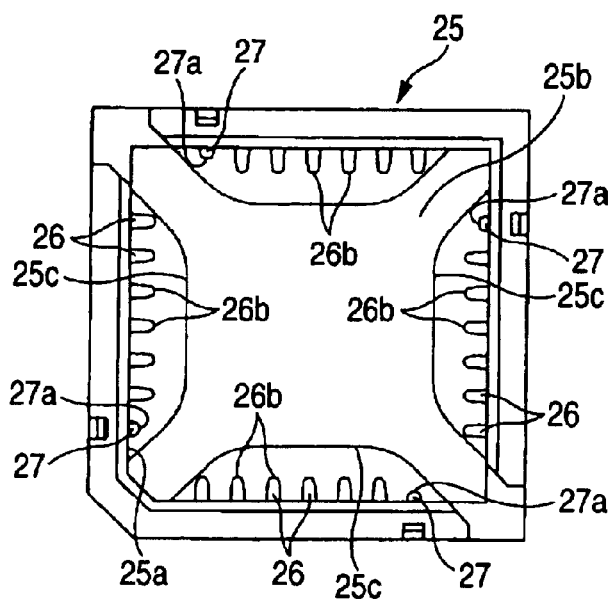
FIG. 2A is a top plan view of a connector according to one embodiment of the invention.
Figure 2B:
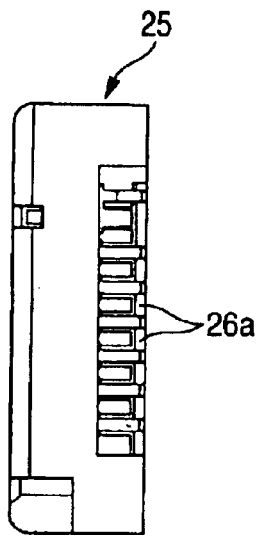
FIG. 2B is a side view of the connector.
Figure 2C:
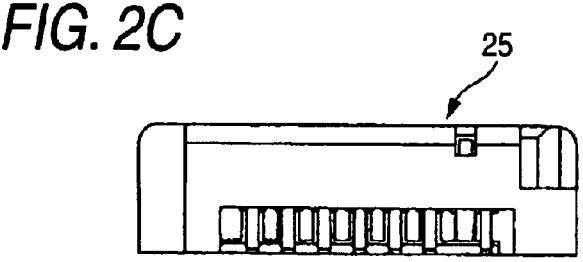
FIG. 2C is a front view of the connector.
Figure 2D:
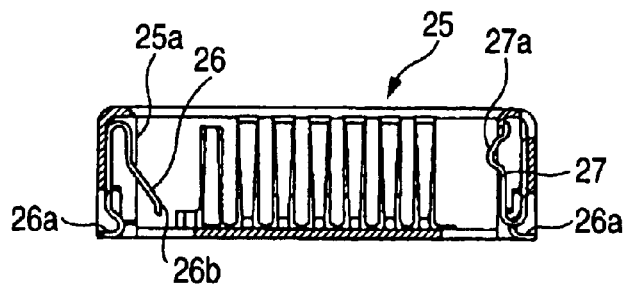
FIG. 2D is a sectional front view of the connector.
Figure 3:
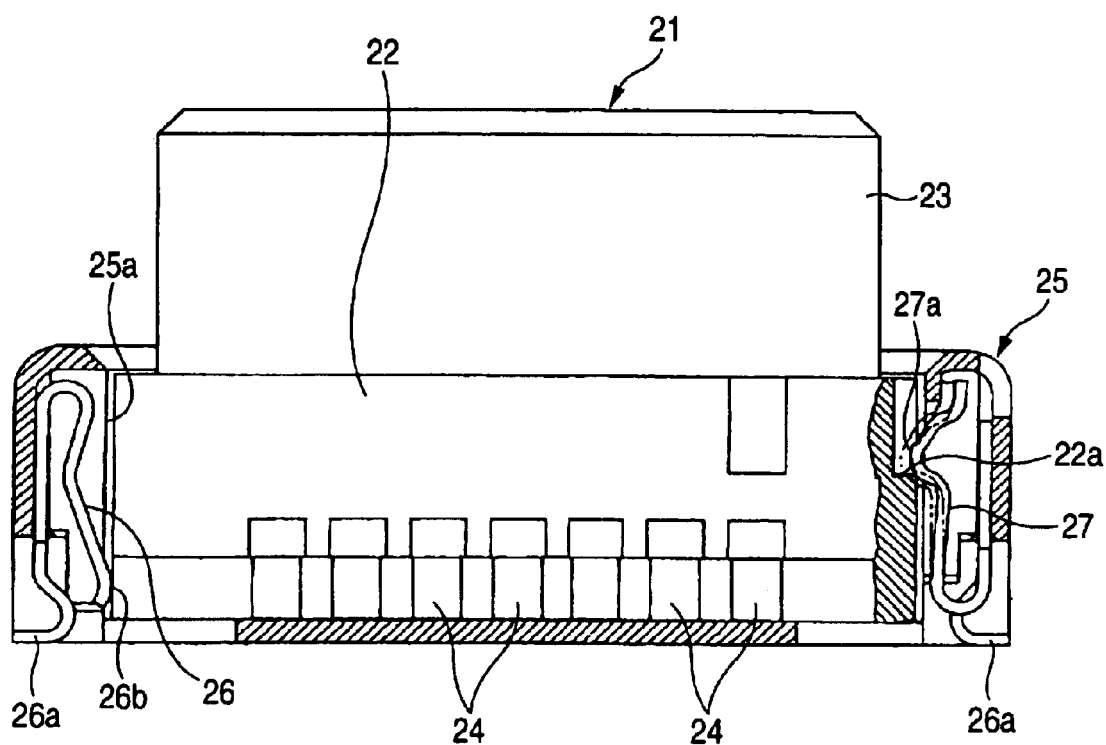
FIG. 3 is a partly sectional front view showing a state that the camera module is fitted with the connector.
Figure 4A:
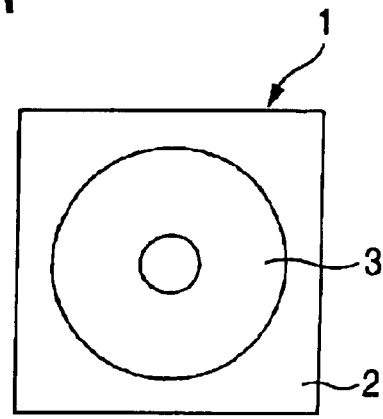
FIG. 4A is a top plan view of a related-art camera module.
Figure 4B:
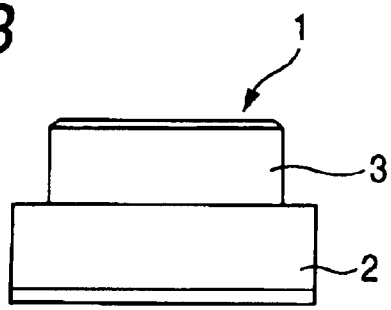
FIG. 4B is a side view of the related-art camera module.
Figure 4C:
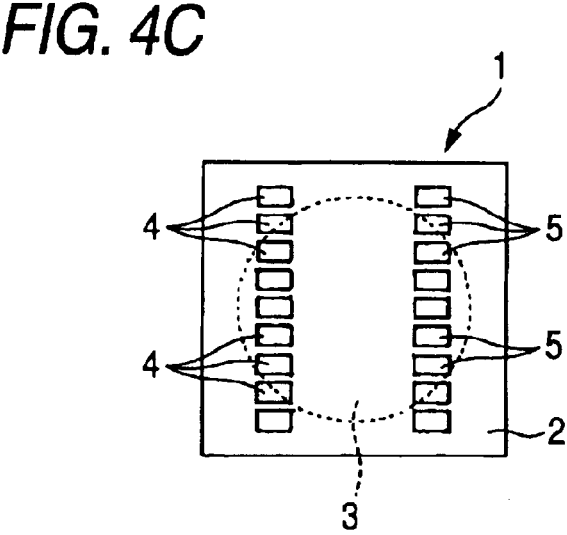
FIG. 4C is a bottom plan view of the related-art camera module.
Figure 5A:
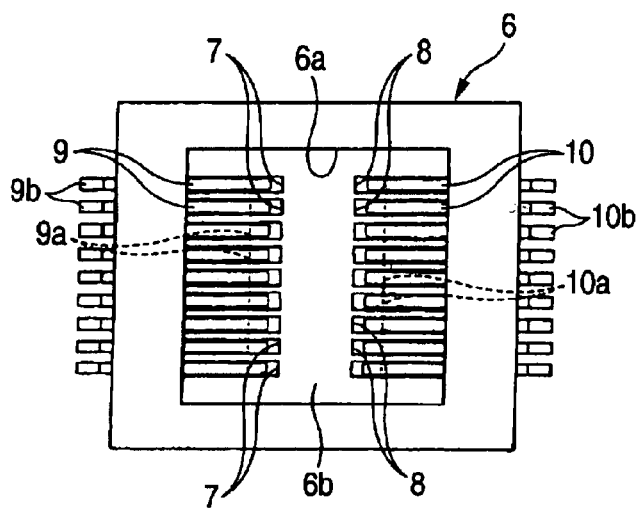
FIG. 5A is a top plan view of a related-art connector.
Figure 5B:
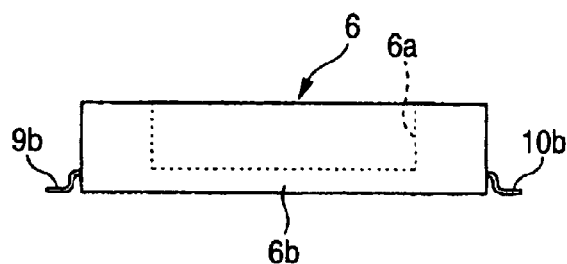
FIG. 5B is a front view of the related-art connector.
Figure 5C:
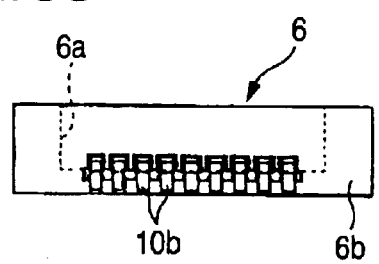
FIG. 5C is a side view of the related-art connector.
Figure 6:
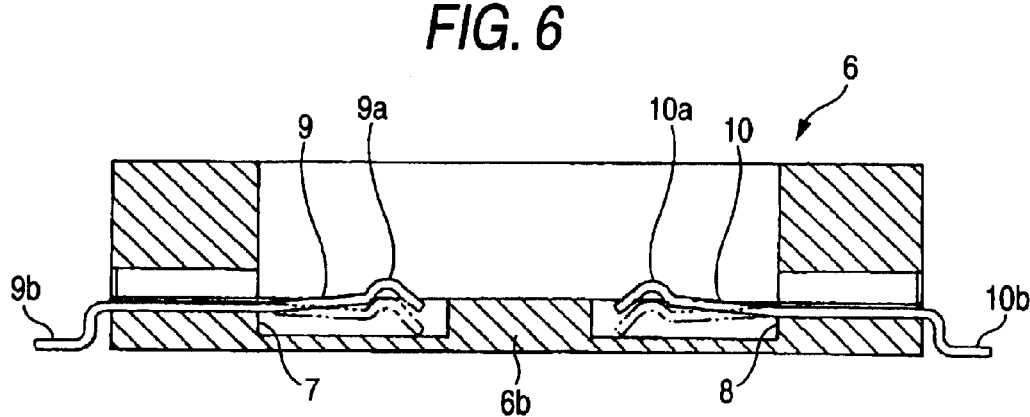
FIG. 6 is a sectional front view of the related-art connector.
Figure 7:
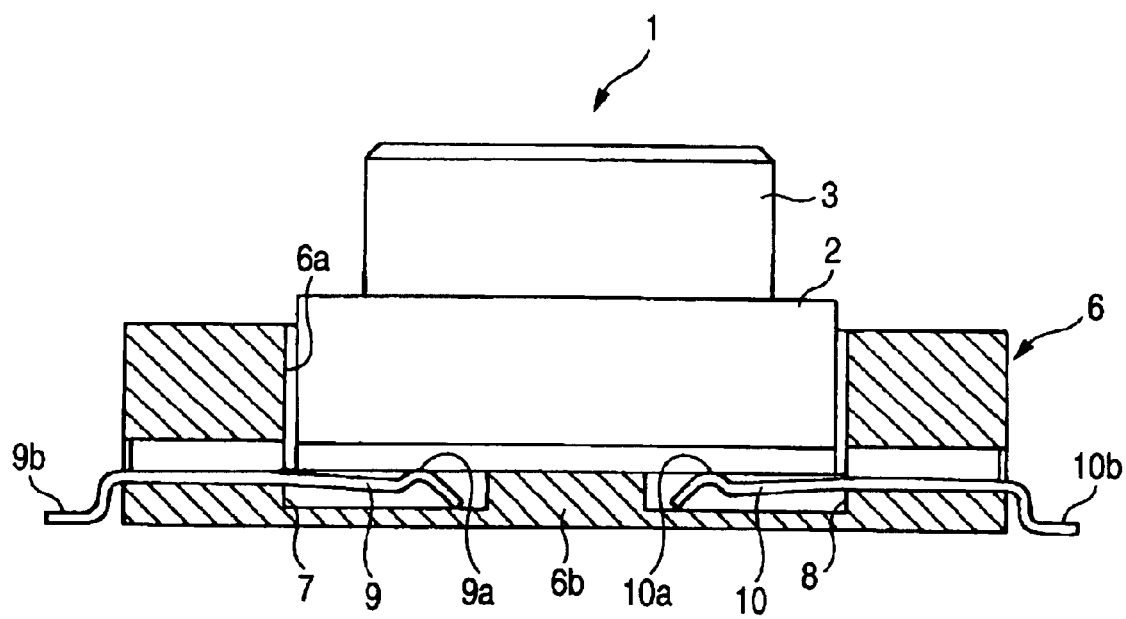
FIG. 7 is a partly sectional front view showing a state that the related-art camera module is fitted with the related-art connector.

FIGS. 2A to 2D show a connector 25 to which the camera module 21 is fitted. This connector 25 is formed into a square box-like body having an upwardly-open chamber 25a. Four side portions of a bottom 25b of the chamber 25a are suitably notched to form openings 25c, and a plurality of parallel contact pins 26 are provided on an inner side wall of the chamber 25a, and extend vertically.

A ground terminal 27 for grounding purposes is provided on each inner side wall of the chamber 25a while being adjacent to each corner of the chamber 25a. Each ground terminal 27 is spaced a predetermined distance from the group of contact pins 26, and extended vertically. The four ground terminals 27 are so provided as to be opposed respectively to the four recesses 22a so that these ground terminals 27 can be engaged in the recesses 22a, respectively.

Each of the contact pins 26 is bent into a generally inverted V-shape, and is fixedly secured to the inner side face of the chamber 25a. One end portion of the contact pin 26 is formed into a terminal 26a which is exposed to the lower side of the connector 25 through the associated opening 25c, and is bent outwardly horizontally so as to be electrically connected with a circuit (not shown) formed on a wiring board (not shown) on which the connector 25 is mounted. The other end portion of the contact pin 26 is bent to project inwardly to form a contact projection 26b for contact with the associated contact pad 24 of the module body 22.

Each of the ground terminals 27 is bent into a generally U-shape, and one end of the ground terminal 27 is fixedly secured to the inner side face of the chamber 25a. That portion of the ground terminal 27, disposed adjacent to the other end (upper end) thereof, is bent to project toward the chamber 25a to form a contact projection 27a. The contact projection 27a is disposed at a level above the contact projections 26b of the contact pins 26.

When the camera module 21 is inserted into the chamber 25a from the upper side of this connector 25, one of the contact pads 24 of the camera module 21 is first brought into contact with the contact projection 27a of an associated one of the ground terminals 27 provided on the inner side face of the chamber 25b, thereby positively removing static electricity of the camera module 21. Therefore, damage due to the static electricity can be prevented.

Then, the contact pads 24 are brought into press-contact with the contact projections 26b of the contact pins 26, while the contact projections 27a of the ground terminals 27 are engaged in the recesses 22a, respectively. With this simple structure, the camera module 21 can be retained against withdrawal. The attachment of the camera module 21 to the connector 25 is thus completed.

Signals of the camera module 21 are transmitted from the contact pads 24 to the contact pins 26 via the contact projections 26b, and further are transmitted to the circuit of the wiring board via the terminals 26a.

In the present invention, various modifications can be made without departing from the spirits of the invention, and such modifications fall within the scope of the invention.

For example, the shape of the recesses 22a is not particularly limited, and these grooves may have any suitable shape in so far as the contact projections 27a can be engaged in the recesses 22a. Alternatively, there may be provided a construction in which the contact projections 27a can be engaged with the upper face of the module body 22.

Although the connector 25 is so designed as to attach the camera module 21 thereto, the connector of the invention is not limited to the type for attaching the camera module thereto, but the invention can be applied to connectors for attaching various modules (such for example as a memory module) or electric parts thereto.

What is claimed is:

1. A connector, to which a module body is electrically connected, comprising:

a connector body, having a top, a bottom, and an inner side faces between said top and said bottom defining a chamber which accommodates the module body, the chamber formed with an opening at said top from which the module body is inserted;

a first, conductive terminal, provided on each inner side face such that a conductive member formed on an outer periphery of the module body is brought into contact with the first terminal in a case where the module body is plenarily accommodated in the chamber; and a second, grounding terminal, provided on each inner side face and operable to be brought into contact with the conductive member of the module body, wherein the first terminal and the second terminal are provided only on said inner side face, and wherein the second terminal is provided at a portion closer to the opening than the first terminal, so that the conductive member of the module body is not in contact with the second terminal when the module body is plenarily accommodated in the chamber.

2. The connector as set forth in claim 1, wherein the second terminal is provided at a portion closer to the opening than the first terminal, so that the conductive member of the module body is first brought into contact with the second terminal when the module body is inserted into the chamber.

3. The connector as set forth in claim 1, wherein the first terminal and the second terminal are extended in a direction parallel to an inserting direction of the module body.

4. The connector as set forth in claim 1, wherein the module body is a camera module.

5. The connector of claim 1, wherein the second terminal is formed with a projection which engages with recesses formed on the module body so that the module body is retained against withdrawal when the module body is plenarily accommodated in the chamber.

6. A connector, to which a module body is electrically connected comprising:
  a connector body, having a top, a bottom, and an inner side faces between said top and said bottom defining a chamber which accommodates the module body, the chamber formed with an opening at said top from which the module body is inserted;
  a first, conductive terminal, provided on each inner side face such that a conductive member formed on an outer periphery of the module body is brought into contact with the first terminal in a case where the module body is plenarily accommodated in the chamber; and
  a second, grounding terminal, provided on each inner side face and operable to be brought into contact with the conductive member of the module body and wherein the second terminal is provided at a portion closer to the opening than the first terminal, so that the conductive member of the module body is not in contact with the second terminal when the module body is plenarily accommodated in the chamber, and wherein:
  the chamber has a rectangular cross section when viewed from the opening; and
  the first terminal and the second terminal are provided on each of four inner side faces defining the chamber.

7. A connector, to which a module body is electrically connected, comprising:
  a connector body, having a top, a bottom, and an inner side faces between said top and said bottom defining a chamber which accommodates the module body, the chamber formed with an opening at said top from which the module body is inserted;
  a first, conductive terminal, provided on each inner side face such that a conductive member formed on an outer periphery of the module body is brought into contact with the first terminal in a case where the module body is plenarily accommodated in the chamber; and
  a second, grounding terminal, provided on each inner side face and operable to be brought into contact with the conductive member of the module body wherein the second terminal is provided at a portion closer to the opening than the first terminal, so that the conductive member of the module body is not in contact with the second terminal when the module body is plenarily accommodated in the chamber, and
  wherein the second terminal is formed with a protrusion which engages with the module body in a case where the module body is plenarily accommodated in the chamber.

8. The connector of claim 7, wherein the second terminal is formed with a projection which engages with recesses on the module body so that the module body is retained against withdrawal when the module body is plenarily accommodated in the chamber.

9. The connector of claim 7, wherein the protrusion is engaged with recesses formed on the module body so that the module body can be retained against withdrawal.

* * * * *